C. RALEIGH & W. V. D. KELLEY.
PRODUCING COLORED PHOTOGRAPHIC PICTURES.
APPLICATION FILED OCT. 7, 1914.
1,217,425.
Patented Feb. 27, 1917.
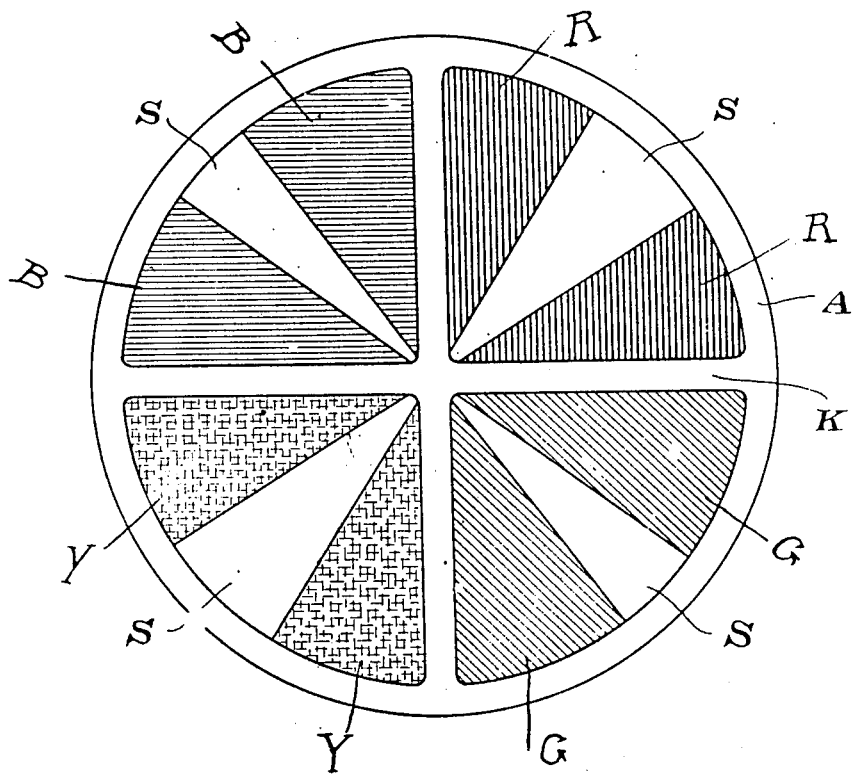
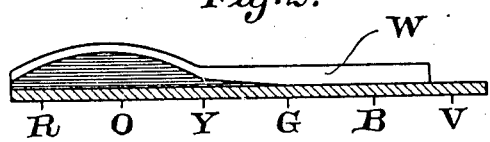
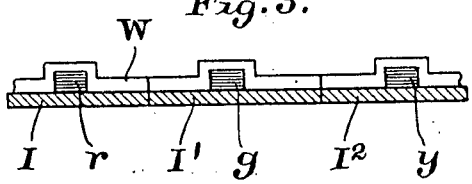
Witnesses:
J. D. Connolly Jr.
Arthur Allen Jr.
Inventors.
Charles Raleigh,
and William V. D. Kelley,
By their Attorneys
Edwards, Sager & Wooster.

UNITED STATES PATENT OFFICE.

CHARLES RALEIGH AND WILLIAM V. D. KELLEY, OF BROOKLYN, NEW YORK, ASSIGNORS, BY MESNE ASSIGNMENTS, TO PRIZMA INCORPORATED, A CORPORATION OF VIRGINIA.

PRODUCING COLORED PHOTOGRAPHIC PICTURES.

1,217,425.  Specification of Letters Patent.  Patented Feb. 27, 1917.

Application filed October 7, 1914. Serial No. 865,431.

*To all whom it may concern:*

Be it known that we, CHARLES RALEIGH and WILLIAM V. D. KELLEY, citizens of the United States, residing at Brooklyn, in the county of Kings and State of New York, respectively, have invented certain new and useful Improvements in Producing Colored Photographic Pictures, of which the following is a full, clear, and exact specification.

This invention relates to photography in colors, and has particular reference to a method for obtaining reproductions of motion pictures in natural colors, whereby the pictures will be of delicate color but full of detail, as contrasted with the usual exaggerated colored images deficient in photographic detail.

In all of the methods known at present for producing photographic pictures in natural colors, wherein color values are recorded in black and white on panchromatic emulsions, the several color values are obtained by filtering the light from the object in taking, and passing the light from the source, in projecting, through color screens. The number of colors embodied in the screens varies in different methods, but in the best known methods, the number of primary colors or combinations thereof, ranges from two to four. That is, the screen carrier employed either in taking or projecting may be divided into two, three, four or more selective colored sections, each section transmitting only rays corresponding thereto and excluding others, thus a succession of negatives is produced in taking, which differ from each other in color values.

In the aforementioned two and three color processes it is necessary to photograph and project at a speed of from 32 to 48 per second, which result produces great difference in the individual density of pictures of different color values, and insufficient detail and exposure.

Our present invention is for the purpose of leveling the varying densities of the different color values in a recurring series of panchromatic pictures, while at the same time retaining a differential color value between them, enabling us to produce colored motion pictures of great detail, of sufficient color, with at least a fifth of the exposure hitherto essential for color work and at a speed practically equal to that of ordinary black and white.

Our invention is adapted to two, three, four, or more color processes. That is, processes in which a corresponding number of different color filters are used for successive pictures. We take a picture through a color filter according to the common practice, but in addition we add to each image an exposure to white light, or light substantially white. By this we mean a light which will record non-selective values, whether exactly isochromatic or not, on the sensitive emulsion, as distinguished from the predetermined selective color values recorded by colored light. These relatively non-selective values can be produced by a wide variety of lights modified or not by a special filter according to the result desired, or to suit the actinic characteristics of the sensitive emulsion used. For example, some emulsions are more sensitive to certain rays in white light than to others, but we still consider such light as white even after such undesirable rays have been partly or wholly filtered out, because non-selective values will still be recorded by such light. Also, some lights contain a preponderating constituent, which, when reduced or eliminated leaves a light which will record non-selective values, and which we consider substantially white as herein defined. This white light is added to each image as made. In one form, the color filters are in the form of a movable screen which is revolved in synchronism with the moving of the film, and each color section of the screen may be provided with a clear opening or slot, which allows the white light to enter. In our preferred form, this opening is in the center of each screen, but it may be placed either at the beginning, at the end, or at any other part without altering the invention.

By this addition of white light for each color screen, or for some of them only, the color negatives not only record values corresponding to that color, but in addition are intensified and leveled up throughout by the white light. The degree of intensification for any image will depend upon the proportion of the white light opening to the entire screen opening. With our improved process, instead of obtaining only an open spot on the red image of a red ball and a white circle having no rotundity on the green image, with a two color process, for example, we get an exposure or record of the red ball on both the images, but unequal in intensity. These successive images may appear almost alike to the eye, but there will be a difference, due to the color values, in both the negative and in the positive made therefrom.

Correction for excessive blue violet rays can be made by partially or wholly filling the open space for the white light in the screens with a yellow filter, or an additional light yellow filter may be employed between the panchromatic film and object photographed. Any other preponderance of light can be similarly corrected by properly coloring the screen opening, or by a correcting screen or filter, either in taking or in projecting. This will be useful in case the emulsion is unduly sensitive to certain rays, or where artificial light is used in taking or projecting, or both.

An illustration of one form of the invention is shown in the accompanying drawing, in which—

Figure 1 shows a four screen arrangement provided with intensifying leveling apertures, and Figs. 2 and 3 are diagrams illustrating the effects of the intensification of the images.

For purposes of illustration, A represents a rotary disk having four color screens, B for blue, R for red, G for green, Y for yellow, separated by spaces K. It will be understood that this screen will be applied to an ordinary camera in taking, and that while the image is being exposed the disk revolves one screen section, being moved from one color to begin the next while the film is being changed from one section to the next. Each of these screens is provided with a non-selective opening or slot S which passes the white light as above described, the slots being proportioned so as to permit the desired volume of white light for each color, and ordinarily uneven, as shown. Uneven colors, with equal slots would produce the same result.

Fig. 2 illustrates the result accompanied by this invention. This represents the markings in cross section of a spectrum, wherein a film has been exposed, for example, to red. This has caused the greatest action on the red parts of the picture as shown by the conventional red shading between R and Y. Then upon exposure to the white light, the action was not so great upon the red, because of diminished activity of the partly exposed emulsion but still having some action, while on the remainder of the image, the white makes a partial record W on the sensitive emulsion between Y and V. This evens up the exposure of the entire picture, by bringing it all up, (but to a lesser extent) than the red portion, even though the red receives a further exposure after, as well as before, the white light. This also applies, if the color is all exposed at once, but better effects are secured by separating the color exposures, as herein shown.

In Fig. 3, the sections I, I¹, I², represent successive images taken through the screens R, G, Y, for example. The shaded portions r, g, y, represent the approximate intensities of the images produced by the respective red, green and yellow rays alone, while the letter W shows how each image is intensified by the addition of substantially white light. The result is that there is not the extreme variation between the intensities r, g, y plus W, as there would be in ordinary color processes between r, g and y alone, and illustrated by the omission of the space W from Fig. 3.

As each screen passes the lens, the exposure is first made through the colored part, then through the open slot which adds the exposure of all the colors in the white light, then a further exposure is made through the remainder of the color screen. Where we speak of white light, we mean a light which records non-selective values and usually containing all the screen colors, whether corrected to compensate for any preponderance, or not. This evens up or intensifies the entire exposure, but leaving a preponderance of color value in the image corresponding to the color of the screen through which this particular image is made. Each image made by this double exposure is a composite having selective color values derived from the screen color, and non-selective values distributed throughout, either exactly isochromatic or not, but derived from a white or similar light exposure. The pictures produced by this method give an effect of solidity and relief more nearly approaching a stereoscopic effect, are more uniform in density, depth and detail, and can be made at a much lower speed and in a much less intense light than pictures produced with prior known methods. The increased effect of solidity and relief resembling a stereoscopic effect is due to the fact that each image contains values representing not only the color screen exposures, but values for white, or substantially white light as well. Thus each image has a greater detail and perspective than a simple color value record alone, would have. In the ordinary two color process employing red and green-blue screens, an object such as a red ball would impress the red negative film area only, the green negative film area would be represented by a white circle only having no rotundity and in projection of a positive made from this negative only the red image would help to give the round form to the ball. In our process employing the white light slot or its equivalent under the same circumstances both the red and the green negative areas would show an image which would possess the necessary shading to produce the effect of rotundity, both images whatever color is photographed, possessing the outlines and shadings of the objects photographed. The correction is easily applied by coloring some or all of the slots S, as with yellow, to correct for excessive blue violet. By means of this correction, the light effect on the emulsion can be made isochromatic, or as much so as desired, for any or all colors.

It will be understood that the method may be carried out in various ways, and by mechanism other than the preferred form illustrated herein, and we do not wish to be understood as restricting ourselves to any particular method, other than as required by the appended claims.

Having thus described our invention, what we declare as new and desire to secure by Letters Patent is:—

1. The method of recording color values which consists in exposing the same panchromatic emulsion to both colored and substantially white light.

2. The method of recording color values which consists in exposing a panchromatic emulsion to both colored and substantially white light in succession.

3. The method of recording color values which consists in exposing a panchromatic emulsion to light of a predetermined color, then to substantially white light, and then again to light of said predetermined color.

4. The method of recording color values which consists in exposing the same panchromatic emulsion to both colored light and white light modified to compensate for abnormal effect of a constituent thereof.

5. The method of recording color values which consists in exposing the same panchromatic emulsion to both colored light, and white light modified to compensate for excessive blue violet contained therein.

6. The step in motion picture photography which consists in transmitting light to a panchromatic emulsion area through both a color selective screen opening and a non-selective color opening.

7. The step in motion picture photography which consists in exposing the same panchromatic emulsion through a color filter and to white light on the same image and compensating for the extreme blue-violet in the white light only.

8. The step in making photographic records which consists in exposing each of a predetermined succession of emulsion sections first through a color filter, the color filters for different sections being different and then to a light containing all of said colors.

9. The step in making photographic records which consists in exposing each of a predetermined succession of emulsion sections first through a color filter, the color filters for different sections being different, and then to characteristically white light corrected to overcome a certain preponderance therein.

10. The step in making photographic records which consists in exposing each of a predetermined succession of emulsion sections first through a color filter, the color filters for different sections being different and then to characteristically white light corrected to overcome ultra violet therein.

11. The method of recording color values which consists in exposing evenly an entire picture area on a panchromatic emulsion to both colored and approximately white light.

12. The step in making photographic records which consists in exposing evenly an entire picture area through a color filter, and to white light.

13. The step in motion picture photography which consists in exposing each successive image of a series through a different color filter of the set, and to white light, compensated, for the extreme blue-violet in the white light only.

14. In motion picture color photography, employing cycles of color selective values, the method which consists in recording all color values on all images, each image of a cycle possessing a different dominant color value.

15. The method of recording a composite photographic image having non-color selective and selective color values which consists in exposing panchromatic emulsion both to light producing a non-selective color value and to light of a color producing a predetermined color selective value.

16. The method of making a series of composite photographic images substantially recording natural colors which consists in successively exposing each image of a series on panchromatic emulsion to both light producing non-selective color values and to colored light producing a predetermined selective color value, and changing the colored light for each image of the series.

17. The method of producing images in substantially natural color and relief which consists in exposing each of a series of panchromatic emulsion sections both to light recording non-selective color values and to light of color recording a predetermined color selective value, changing the colored light for each image of the series, and positively projecting each image in like succession with colored light correlated to the taking light.

18. The method of producing images in substantially natural color and relief which consists in exposing each of a series of panchromatic emulsion sections both to light recording non-selective color values and to light of color recording a predetermined color selective value, changing the colored light for each image of the series, and positively projecting each image in like succession with both colored light corresponding to the taking light and white light.

19. The method of producing motion pictures in substantially natural color and relief with color screens which consists in successively projecting a series of images each comprising non-selective color values, and predetermined different color selective values correlated to the screen colors, and changing the screen color with each successive image.

20. The method of making photographic records which consists in exposing successive sections of panchromatic emulsion in a series to white light, and exposing each emulsion section between said white light exposures to a predetermined different colored light.

In testimony whereof we affix our signatures, in presence of two witnesses.

CHARLES RALEIGH.
WILLIAM V. D. KELLEY.

Witnesses:
J. S. WOOSTER,
FRED HAMISCH.